United States Patent [19]

Kalfoglou

[11] 4,344,487
[45] Aug. 17, 1982

[54] MODIFIED LIGNOSULFONATES AS ADDITIVES IN OIL RECOVERY PROCESSES INVOLVING CHEMICAL RECOVERY AGENTS

[75] Inventor: George Kalfoglou, Houston, Tex.

[73] Assignee: Texaco Inc., White Plains, N.Y.

[21] Appl. No.: 130,911

[22] Filed: Mar. 17, 1980

Related U.S. Application Data

[63] Continuation of Ser. No. 901,165, Apr. 28, 1978, abandoned, and a continuation-in-part of Ser. No. 807,948, Jun. 20, 1977, abandoned, and a continuation-in-part of Ser. No. 745,505, Nov. 26, 1976, abandoned, and a continuation-in-part of Ser. No. 745,496, Nov. 26, 1976, abandoned, and a continuation-in-part of Ser. No. 745,495, Nov. 26, 1976, abandoned, and a continuation-in-part of Ser. No. 745,494, Nov. 26, 1976, abandoned.

[51] Int. Cl.$^3$ ............................................. E21B 43/22
[52] U.S. Cl. .................................... 166/274; 166/273; 252/8.55 D
[58] Field of Search ................. 252/8.55 D; 166/273, 166/274, 275

[56] References Cited

U.S. PATENT DOCUMENTS 3,384,171  5/1968  Parker .................................. 166/274
3,469,630  9/1969  Hurd ..................................... 166/250
3,700,031  10/1972 Germer et al. .................. 166/273 X
3,797,574  3/1974  Feuerbacher et al. .............. 166/274
3,841,887  10/1974 Falkehag et al. .................... 260/124

*Primary Examiner*—Herbert B. Guynn
*Attorney, Agent, or Firm*—Carl G. Ries; Kenneth R. Priem

[57] ABSTRACT

A process for producing petroleum from subterranean formations is disclosed wherein production from the formation is obtained by driving a fluid from an injection well to a production well. The process involves injecting via the injection well into the formation an aqueous solution of modified lignosulfonate salt as a sacrificial agent to inhibit the deposition of surfactant and/or polymer on the reservoir matrix. The process may best be carried out by injecting the modified lignosulfonates into the formation through the injection well mixed with either a polymer, a surfactant solution and/or a micellar dispersion. This mixture would then be followed by a drive fluid such as water to push the chemicals to the production well. The lignosulfonates may be modified by any combination of any two or more of: reaction with chloroacetic acid, reaction with carbon dioxide, addition of the methylene sulfonate radical to the lignosulfonate molecule and oxidation with oxygen.

9 Claims, No Drawings

MODIFIED LIGNOSULFONATES AS ADDITIVES IN OIL RECOVERY PROCESSES INVOLVING CHEMICAL RECOVERY AGENTS

This application is a continuation of application Ser. No. 901,165, filed Apr. 28, 1978, now abandoned, which in turn is a Continuation-In-Part of co-pending applications: Ser. No. 745,494, filed Nov. 26, 1976; Ser. No. 745,495, filed Nov. 26, 1976; Ser. No. 745,505, filed Nov. 26, 1976; Ser. No. 807,948 filed Jun. 20, 1977 and a Continuation-In-Part of application Ser. No. 745,496 filed Nov. 26, 1976, all now abandoned.

BACKGROUND OF THE INVENTION

1. Field of the Invention

This invention relates to the recovery of oil from subterranean formations by chemical flooding methods.

2. Description of the Prior Art

Petroleum is frequently recovered from subterranean formations or reservoirs by permitting the natural energy of the reservoir to push the petroleum up through wells to the surface of the earth. These processes are referred to as primary recovery methods since they use the natural energy of the reservoir. However, a large amount of oil, generally in the range of 65-90% or more, is left in the subterranean formation at the conclusion of the primary recovery program. When the natural reservoir energy is unable to produce more petroleum, it is a common practice to resort to some form of supplemental recovery technique in order to recover additional petroleum left in the subterranean formation. These supplemental operations are normally referred to as secondary recovery operations. If this supplemental recovery operation is the second in a series of such operations, it will be referred to as a tertiary recovery operation. However, the terminology is unimportant for the purposes of this application and relates only to the sequence in which they are carried out.

The most widely used supplemental recovery technique because of its ease of implementation and low capital outlay is water flooding through injection wells drilled into the subterranean formation. In a water flooding operation, the injected fluid displaces oil through the formation to be produced from the injection well. A major disadvantage to water flooding, however, is its relatively poor displacement efficiency largely due to the fact that water and oil are immiscible at reservoir conditions and high interfacial tension exists between the flood water and the oil. For this reason, after a water flood, a large portion of the oil is still left unrecovered in the reservoir.

It has been recognized by those skilled in the art that a solution effecting a reduction in this interfacial tension between water and oil would provide a much more efficient recovery mechanism. Therefore, the inclusion of a surface active agent or surfactant in the flood water was recognized as an acceptable technique for promoting displacement efficiency of the reservoir oil by the water. For example, U.S. Pat. No. 3,468,377 discloses the use of petroleum sulfonates in water flooding operations and U.S. Pat. No. 3,553,130 discloses the use of ethylene oxide adducts of alkyl phenols for the same purpose. The use in water flooding operations of water soluble surface active alkaline earth resistant polyglycol ethers is disclosed in U.S. Pat. No. 2,333,381. Other specialized surfactants, as will be discussed later, have been discovered to have special properties useful in water flooding operations such as a tolerance for high salinity and calcium, and/or magnesium ion concentration often found in reservoir waters.

However, field operations employing surfactants and surface active agents in injected fluid have not always been entirely satisfactory due to the fact that these materials are often adsorbed by the formation rock to a relatively high degree, resulting in an ever declining concentration of the materials as they progress through the reservoir. Therefore, large concentrations of surface active materials have heretofore been necessary to maintain a sufficient concentration at the oil-water interface. Due to this, many proposed flooding operations involving surface active materials have been uneconomical.

Another serious problem for any recovery technique involving the driving of oil with a fluid is premature breakthrough of the injection fluid. This premature breakthrough indicates that the reservoir has not been adequately swept of oil. The problem is often described in terms of sweep efficiency as distinguished from the displacement efficiency described above. Displacement efficiency involves a microscopic pore by pore efficiency by which water displaces oil, whereas sweep efficiency is related to the growth portion of the reservoir which is swept and unswept by the injected fluid. A major cause of poor sweep efficiency is associated with the fact that the injected fluid generally has a lower viscosity than the displaced fluid (petroleum). Thus, the injected fluid has a higher mobility and tends to finger through the oil, prematurely breaking through to the production well.

One solution to this high mobility problem is to increase the viscosity of the driving fluid. A way to do this is to add polymeric organic materials to a driving water which has the effect of increasing the viscosity of the water, thereby increasing the sweep efficiency of the supplemental recovery process. U.S. Pat. No. 3,039,529 and U.S. Pat. No. 3,282,337 teach the use of aqueous polyacrylamide solutions to increase the viscosity of the injected fluid thereby promoting increase sweep efficiency. Polysaccharides as taught in U.S. Pat. No. 3,581,824 have been used for the same purpose. These polymers are quite expensive and any polymer lost to adsorption on the reservoir matrix adds substantially to the cost since additional polymer is required to maintain a given viscosity.

The above described problems have been recognized by those skilled in the art of oil recovery and certain sacrificial compounds have been added to pretreat the formation in order to decrease the adsorption of subsequently injected surfactants and/or polymers. For example, U.S. Pat. No. 3,424,054 discloses the use of aqueous solutions of pyridine; U.S. Pat. No. 3,469,630 discloses the use of sodium carbonate and inorganic polyphosphates, and U.S. Pat. No. 3,437,141 discloses the use of soluble carbonates, inorganic polyphosphates and sodium borate in combination with saline solution of a surfactant having both a high and a low molecular weight component. These materials have not been completely satisfactory from a standpoint of preformance and economics however.

U.S. Pat. No. 3,384,171 to Parker discloses that unmodified lignosulfonates may be used as a preflush followed by a surfactant solution. While this method provides an improvement over using surfactant alone, my invention provides an improvement in oil recovery over the process of Parker. My copending application Ser.

No. 715,957 filed Aug. 19, 1976 claims unmodified lignosulfonates as sacrificial agents. The present invention provides an improvement over that process.

SUMMARY OF THE INVENTION

The invention is a process of producing petroleum from subterranean formation having an injection well and a production well in communication therewith. The process comprises injecting into the formation via the injection well an aqueous solution of lignosulfonate salts modified by any combination of two or more of the following: reaction with chloracetic acid, reaction with carbon dioxide, addition of the methylene sulfonate radical to the lignosulfonate molecule and oxidation with oxygen, in admixture with a chemical oil recovery agent; for example, surfactant, polymer and/or a micellar dispersion. It is the usual practice to then inject a fluid such as water to sweep the chemical components through the reservoir to the production well, thereby displacing oil from the subterranean formation to the surface of the earth.

DESCRIPTION OF THE PREFERRED EMBODIMENTS

A sacrificial material is injected by the process of this invention through an injection means comprising one or more injection wells into a subterranean petroleum-containing formation to prefereably occupy or cover all potential adsorption sites of the rock within the subterranean formation thereby reducing the extent of adsorption of the more expensive chemical oil recovery agent injected therewith. A sacrificial agent performs best when it exhibits high adsorption on active sites of rock surfaces, and thus diminishes surfactant and/or polymer adsorption. Chemical compounds of polyelectrolytic nature have the proper physico chemical and structural requirements to behave as successful sacrificial agents. The functional group on the sacrificial agent molecules enhances adsorption either by hydrogen bonding or electrostatic attraction to active sites on the rock surfaces.

A satisfactory sacrificial material has at least three important characteristics. First, it should be less expensive than the surfactant on a cost effectiveness basis since it is to be sacrificed or adsorbed by the formation, probably not to be recovered. Next, it must be adsorbed readily by the subterranean formation matrix. Preferably the sacrificial material should be adsorbed more readily than the chemical oil recovery agent to be used in the process. The third important characteristic of an sacrificial agent is that the presence of such adsorbed sacrificial material should retard or eliminate adsorption of the surfactant and/or polymer chemical recovery material on the adsorption sites of the formation rock. By adsorption sites of the formation rock it is meant those parts of the surfaces of the pores of the formation rock capable of adsorbing a chemical compound from a solution on contact.

The sacrificial material may not have a detrimental effect on the recovery efficiency of the chemical flooding operation. Additional oil is usually recovered only if the sacrificial material is followed by or is admixed with a surfactant and/or a polymer chemical recovery agent which will effectively increase the amount of oil displaced from the subterranean formation. When the surfactant is chosen as the chemical recovery agent it should be injected in admixture with the sacrificial agent for best results and ahead of the following flooding water thereby achieving the desired interfacial tension reduction between the injected fluid and the displaced fluid with minimal loss of surfactant on the formation matrix. The surfactant may be present in a hydrocarbon solvent or in an aqueous solution or in a combination thereof. Any anionic, nonionic and/or cationic type of surfactant known in the art may be used in the pratice of this invention. Some types of surfactants were mentioned previously. In addition, surfactants disclosed and claimed in the following U.S. Patents, for example, are particularly useful since they have been found to be capable of performing in reservoirs having both high salinities and high hardness levels: U.S. Pat. Nos. 3,858,656; 3,811,505; 3,811,504 and 3,811,507.

Likewise, the amount of surfactant which must be employed in the practice of any chemical flood is generally known in the art and is to be found in published literature. However, the slug size of surfactant generally will range from about 0.01 to 1 pore volumes of an aqueous surfactant solution having dissolved therein from about 0.01 to about 10.0 percent by weight of the surfactant itself.

In my invention the sacrificial agent is preferrably injected in admixture with the surfactant slug into the petroleum formation. This surfactant/sacrificial agent mixture may or may not be preceded by a slug of sacrificial material in aqueous solution only. It has been found that this technique is superior to the preflush method of injecting a slug of sacrificial material followed by a slug of surfactant solution without sacrificial material. However, the preflush method is superior to using no sacrificial material at all.

In any of these embodiments and others which are obvious to those skilled in the art, the surfactant containing slug may be followed by a material to taper the viscosity before drive water is injected. This technique known well to those skilled in the art prevents the water from fingering into the more viscous surfactant containing slug.

In a specific embodiment of this invention, a sacrificial material comprising modified lignosulfonate salts, as described in the Summary of the Invention is injected via the suitable injection means, i.e. through one or more injection wells completed in the subterranean hydrocarbon formation, in admixture with a surfactant solution. By injecting the sacrificial material and surfactant together oil recovery is maximized. The oil recovery is greater than preflushing the formation with sacrificial agent and followed with surfactant solution. Another embodiment of my invention is the use of modified lignosulfonates in conjunction with an emulsion of water, hydrocarbon and surfactant, i.e. a micellar dispersion. The same parameters as discussed above for simple aqueous surfactant solutions would apply to micellar dispersions. Micellar dispersions are known in the art. See, for example, U.S. Pat. No. 3,536,136 incorporated here by reference.

The sacrificial agents useful in the process of my invention are lignosulfonate salts which have been modified by further chemical reaction as described herein. Lignosulfonates are anionic polyelectrolytes soluble in water and tolerate hard water (polyvalent ions, e.g. calcium and magnesium). They are also thermally stable in formations where the temperature is high. Lignosulfonates are macromolecules built up by complex condensation of phenyl propane units. The sulfonate groups are attached to the aliphatic side chain, mainly to alpha carbon. Lignosulfonates are water soluble with molecular weights ranging from several thousand to around 50,000 or more.

They are economically attractive since being by-products of the pulping industry, they are plentiful and cost less than either the surfactants or the polymers used in enhanced oil recovery methods. The polyelectrolyte lignosulfonates with strongly ionized sulfonate groups are negatively charged species and have a tendency to adsorb on solid surfaces thereby imparting a negative charge to them. The rock surfaces of a reservoir treated with lignosulfonate will be inert towards the anionic surfactants in the flood water and therefore loss of surfactants to the rock surfaces will be kept to a minimum. The same phenomenon will ocur with the polymer thickened drive fluid.

Lignin is second only to cellulose as the principal constituent in wood. Generally, lignin is a complex phenolic polyether containing many different functional groups including carboxyls, carbonyls, and alcoholic and phenolic hydroxyls. Lignins and their derivatives are described in Kirk-Othmer Encyclopedia of Chemical Technology, Second Edition, Vol. 12, beginning at page 362. This publication describes two very broad classes of lignin derivatives: sulfite lignins and alkali lignins.

The difference in the lignins exists because of the method of extraction of lignin material from woody materials. Sulfonated alkali lignins are readily available commercially from various sources including but not limited to West Virginia Pulp and Paper Company under the trade name REAX. Their general method of preparation is described in the Encyclopedia of Chemical Technology referred to above. Briefly, sulfonated alkali lignins are prepared by cooking woodchips with a 10% solution of a mixture of sodium hydroxide with about 20 mole percent of sodium sulfide. The liquin with wood is modified into a sodium compound often termed sodium lignate or alkali lignin which is very soluble in the strongly alkaline solution. These alkali lignins are removed from solution by lowering the pH which precipitates out the alkali lignins. These unsulfonated alkali lignins are sold under various tradenames including INDULIN. These alkali lignins are used to prepare the sulfonated derivatives. Methods of sulfonation are known by those skilled in the art. One typical method involves treating the alkali lignins with a solution of alkali sulfites at elevated temperature and pressure. The degree of sulfonation may be controlled to provide a variety of sulfonated alkali lignins.

The other main type of lignin derivatives are called sulfite lignins or sulfite lignosulfonates. Sulfite lignins are generally made by cooking woodchips under pressure in a solution of sulfurous acid and calcium, magnesium, sodium or ammonium bisulfite. This process converts insoluble lignins to soluble lignosulfonic acid. The lignosulfonic acids or calcium, magnesium, sodium or ammonium salts of the lignosulfonic acids are available under various tradenames including MARASPERSE, LIGNOSITE, ORZAN, TORANIL, and RAYFLO.

The broad term lignosulfonates used herein refers to both sulfonated alkali lignins and sulfite lignosulfonates (sulfite lignins). These are distinct types of compounds as explained above. Since the alkali lignins require sulfonation after extraction of the material from woody products it is proper to call them sulfonated alkali lignins. Likewise since sulfite lignins emerge from the extraction process already sulfonated it is proper to refer to this class of materials as sulfite lignins or sulfite lignosulfonates.

My invention is the use of sulfonated alkali lignins and sulfite lignosulfonates, each modified by further chemical reaction as described herein. Lignosulfonates having degrees of sulfonation from about 2.0 to saturation are acceptable as starting materials for the compounds of my invention. Cations which are acceptable include $Na^+$, $K^+$, $NH_4^+$, $CA^{++}$, and $Mg^{++}$. The degree of sulfonation is the weight percentage of sulfonate ($SO_3^-$) compared to the total molecular weight.

Crude unmodified lignosulfonates may be made with either softwoods or hardwoods. Although having basically the same functional groups the crude unmodified softwood lignosulfonates have more sulfonate and hydroxyl groups than the crude unmodified hardwood lignosulfonates. Thus, in general, crude unmodified softwood lignosulfonates have better hard watter ($Ca^{++}$, $Mg^{++}$) tolerance than the hardwood form.

The lignosulfonates of my invention are those which have been modified by any combination of any two or more of the following reactions: reaction with chloroacetic acid, reaction with carbon dioxide, addition of methylene sulfonate radicals to the lignosulfonate molecule and oxidation with oxygen. For example, the lignosulfonate may first be reacted with chloroacetic acid and substantially reacted with carbon dioxide. Further reaction as noted above may then be performed if desired. Also, any one of the four modifications may be employed first followed by one or more of the others. A brief description of each of the above modification reactions follows.

Sulfomethylation of Lignosulfonates

Sulfomethylation of lignosulfonates may take place by various routes known to those skilled in the art. My invention is not limited to the use of products made by any specific route. Any route which adds the methylene sulfonate radical is acceptable. In one route, formaldehyde and a bisulfite salt is reacted with crude unmodified lignosulfonates under basic conditions to yield a product with additional sulfonate groups attached to the lignosulfonate through methyl groups. For example, sodium, potassium, calcium or magnesium bisulfites are useful. It is believed that the predominance of these groups attach at the ortho sites of aryl groups in the lignosulfonate.

Reaction of Carbon Dioxide with Lignosulfonates

Carbon dioxide reacts predominantly with the ortho sites of the aryl groups in the lignosulfonate molecule and to a lesser extent with the para sites. This is well known in the art as the Kolbe reaction.

Reaction with Chloroacetic Acid

Carboxylation of lignosulfonates by reaction with chloroacetic acid or its salts by methods known in the art yields products rich in carboxylate groups. The chloroacetic acid reacts with hydroxyl groups to yield acetates and with phenolic groups to yield phenoxy acetates and with sulfonates to yield ester acetates.

Reaction with Oxygen (Oxidation)

The term oxidized or oxidation for purposes of this disclosure refer to those reactions which have the following effect on the unmodified lignosulfonate molecule. Oxidation of the unmodified lignosulfonates results in the formation of carboxyl groups from carbonyl groupings, alcoholic hydroxyl groups and at least a portion of terminal —CH$_3$ groupings on alkyl side chains and also by a demethylation of at least a portion of the methoxy groupings which appear as a portion of the ring structure. Oxidation also results in conversion of aromatic methoxy groups to form phenolic groups.

Air, air enriched with oxygen and/or oxygen is useful for oxidation of the unmodified lignosulfonate molecule as described above. Alternatively, where air, enriched air or oxygen will not produce the oxidative effects noted above it has been found necessary to react unmodified lignin type materials with an oxygen containing gas which also contains ozone. U.S. Pat. No. 3,726,850 describes such a reaction scheme on lignin type materials. The disclosure of U.S. Pat. No. 3,726,850 is incorporated herein by reference to the extent that it describes the effect of oxidation on a lignin type molecule (which effects would also be applicable to lignosulfonates). The reaction conditions described in U.S. Pat. No. 3,726,850 may or may not be altered somewhat when reacting with a lignosulfonate instead of a lignin to obtain the same effects on the molecule.

Reactions such as lignosulfonates with chromate or dichromate and the like are not within the scope of this disclosure or the term oxidized as may be used in the claims appended hereto.

The quantity of lignosulfonates modified as above to be injected into the subterranean hydrocarbon formation may be any amount up to and including an amount sufficient to occupy substantially all of the active sites of the formation matrix. If less than the maximum amount is used, there will be a corresponding increase in the adsorption of surfactant from injection solution onto the formation matrix although the amount of increase will not be as great as in the case where the formation is completely free of modified lignosulfonate salts. At a maximum, only the amount of modified lignosulfonate salts needed to completely occupy the active sites on the formation matrix is needed. The detriment resulting from using excess modified lignosulfonate salts would be an increase in the cost of operating the oil recovery program.

The amount of modified lignosulfonate salts needed in the process of the invention depends on the particular formation, the area or pattern to be swept and other formation characteristics. Those skilled in the art can determine the exact quantity needed to afford the desired amount of protection.

Generally it has been found that the amount of modified lignosulfonate in the surfactant slug will be effective in amounts of from about 0.01 to about 10.0 percent by weight of the total surfactant solution (including the aqueous portion). Total modified lignosulfonate will be effective at the above concentrations in amounts ranging from 0.01 to 1.0 pore volumes of the aqueous solution of surfactant-sacrificial agent or only sacrificial agent solution.

The effectiveness of this invention for reducing the adsorption of surfactant or polymer on formation rock and chemical flooding operations is demonstrated by the following examples which are presented by way of illustration and are not intended as limiting the spirit and scope of the invention as defined in the claims.

The following Examples demonstrate the performance of modified lignosulfonates in oil recovery from crushed limestone packs or sand packs in the laboratory.

EXAMPLE I

The starting crude lignosulfonates were either hardwood or softwood products. The calcium salt was converted to sodium salt to evaluate the effect of this modification step. Lignosulfonates were modified by performing reactions such as carboxylation by oxidation, carboxylation by chloroacetic acid, sulfomethylation and carboxylation by reaction with carbon dioxide. Each reaction yields products with different functional groups. The types of functional groups obtained by each reaction are additive, and those affect both the tolerance of lignosulfonates to brine and the affinity of lignosulfonates to adsorb on surfaces of interest. The choice of an adsorbent to be used in the evaluation of sacrificial agents is important. For accurate evaluation, one must utilize adsorbents which allow high surfactant adsorption.

To compare the effectiveness of various lignosulfonates as sacrificial agents the single surfactant system sulfonated four mole ethylene oxide adduct of dodecyl phenol was used. Shake bottle tests were performed to evaluate the mitigation of surfactant adsorption to precipitated $CaCO_3$ at 77 kg/m$^3$ TDS and 43° C. Adsorption values of Adduct D-40 CS* with or without lignosulfonates present are tabulated below:

*Sulfonated 4 mole ethylene oxide adduct of dodecyl phenol.

| Surfactant System 10 kg/m$^3$ Adduct D-40CS + 10 kg/m$^3$ Lignosulfonate | Description | mg Surfactant Adsorbed g $CaCO_3$ |
|---|---|---|
| No Lignosulfonate | | 22.8 |
| Norlig 42Z | Na salt; Hardwood, Carboxylated by Oxidation | 6.5 |
| Norlig 42CAA | Na salt; Hardwood, Carboxylated by Chloroacetic acid | 12.0 |
| Norlig 42ZCAA | Na salt; Hardwood, Carboxylated by Oxidation and Chloroacetic acid | 5.0 |
| Norlig 92Z | Na salt; Softwood, Carboxylated by Oxidation | 1.0 |
| Norlig 92CAA | Na salt; Softwood, Carboxylated by Chloroacetic acid | 9.7 |
| Norlig 92ZCAA | Na salt; Softwood, Carboxylated by Oxidation and Chloroacetic acid | 0.5 |
| Norlig 41ZCAA | Ca salt; Hardwood, Carboxylated by Oxidation and Chloroacetic acid | 10.4 |
| Norlig 91ZCAA | Ca salt; Softwood, Carboxylated by Oxidation and Chloroacetic acid | 1.0 |
| Norlig 51 S-Z | Ca salt; Softwood, Sulfomethylated, Carboxylated by Oxidation | 4.1 |

Results indicate that the softwood lignosulfonate derivatives exhibit greater mitigation of surfactant adsorption than the hardwood lignosulfonate derivatives when $CaCO_3$ is used as adsorbent. Conversion from Ca salt to Na salt has a moderate beneficial effect on the effectiveness of the product. Improved tertiary oil recovery efficiency achieved when lignosulfonates are incorporated into surfactant systems may not be solely due to a sacrificial agent effect. In addition to mitigation of surfactant adsorption on pore surfaces, other mechanisms may also contribute to an improved oil recovery efficiency of a surfactant system.

EXAMPLE II

Modified lignosulfonates exhibit high sacrificial agent activity when exposed to calcium carbonate surfaces in shake bottle tests. Four different reaction have been employed to obtain derivatives of lignosulfonates.
(A) Oxidation reaction
(B) Chloroacetic acid reaction
(C) Sulfomethylation reaction, and
(D) Carbon dioxide reaction.

Modified lignosulfonates with several types of functional groups can be prepared by employing any one of the above reactions or combinations of these reactions. The availability of modified lignosulfonates with different types of functional groups is desirable because the more functional groups lignosulfonates have, the greater tolerance to higher salinity and hardness brines. The presence of different types of functional groups (both polar and nonpolar) on lignosulfonates should contribute to the attractive forces on substrates and enhance the sacrificial agent activity of these compounds.

The surfactant system (as in Example I) (with or without lignosulfonates) was used to determine relative sacrificial agent effectivenss of lignosulfonates on precipitated calcium carbonate. Shake bottle tests were performed to evaluate surfactant adsorption mitigation at 77 kg/m$^3$ TDS and 43° C. Several adsorption values of Adduct D-40CS with or without lignosulfonates present are tabulated below:

| Surfactant System<br>10 kg/m$^3$ Adduct D-40CS<br>+<br>10 kg/m$^3$ Lignosulfonate | mg<br>Surfactant Adsorbed<br>g CaCO$_3$ |
| --- | --- |
| No sacrificial agent | 21.6 |
| Norlig 92g<br>(Softwood:unmodified, Na salt) | 17.5 |
| Norlig 92Z<br>(Softwood:oxidized, Na salt) | 1.0 |
| Norlig 41ZCAA*<br>(Hardwood:oxidized, carboxylated, Ca salt) | 10.4 |
| Norlig 41SCAA<br>(Hardwood:sulfomethylated, carboxylated,<br>Ca salt) | 11.3 |
| Norlig 91ZCAA<br>(Softwood:oxidized, carboxylated<br>Ca salt) | 1.0 |
| Norlig 91SCAA<br>(Softwood:sulfomethylated, carboxylated<br>Ca salt) | 6.0 |

*All products with "CAA" in the name were carboxylated with chloroacetic acid.

It is observed that the oxidized and carboxylated lignosulfonates are more effective sacrificial agents here than the sulfomethylated and carboxylated ones. This is true for both the hardwood and softwood derivatives. It is to be noted that the softwood modified lignosulfonates exhibit greater surfactant adsorption inhibition on CaCO$_3$ than the hardwood modified lignosulfonates. This is probably due to the fact that the softwood degree of sulfonation is higher than the hardwood degree of sulfonation.

Since various structural forms of modified lignosulfonates are available, it is possible to prepare modified lignosulfonates which should exhibit high surfactant adsorption mitigation for a given surfactant system on a substrate of interest such as limestone, sandstone and others.

EXAMPLE III

Derivatives of lignosulfonates exhibit varying degrees of sacrificial agent activity when calcium carbonate is used as substrate. Oxidized and carboxylated lignosulfonates have been tested for surfactant adsorption mitigation. In this investigation sandstone (Dog Lake EE sand) was used to determine how structural differences of modified lignosulfonates affect their performance as sacrificial agents on sandstone.

The surfactant (as in Examples I and II) was used in surfactant systems where the salinity was maintained at 77 kg/m$^3$ TDS and the temperature at 43° C. Quantities of 50 g of sandstone were exposed to 50 cc surfactant solutions to achieve large enough surfactant concentration changes for accurate adsorption value determinations. Bottles containing the mixtures were shaken for 24 hours and then they were equilibrated for 3 days prior to centrifugation, which was done to effectively separate the adsorbent from the equilibrium solutions. Several adsorption values of systems composed of 10 kg/m$^3$ (1%, w/v) surfactant and 10 kg/m$^3$ (1%, w/v) lignosulfonate are tabulated below:

| Lignosulfonates | mg Surfactant Adsorbed<br>g Dog Lake EE Sand |
| --- | --- |
| No sacrificial agent | 1.5 |
| Norlig 92g (Softwood:unmodified) | 1.1 |
| Norlig 92Z (Softwood:oxidized<br>Na salt) | 0.8 |
| Norlig 92ZCAA (Softwood:oxidized,<br>carboxylated, Na salt) | 0.7 |
| Norlig 42Z (Hardwood:oxidized,<br>Na salt) | 0.5 |
| Norlig 42ZCAA (Hardwood:oxidized,<br>carboxylated, Na salt) | 0.4 |

The adsorption tests indicated that both the oxidized and the oxidized and carboxylated lignosulfonates have greater effectiveness as sacrificial agents on sandstone substrates than the unmodified lignosulfonate. Results also indicate that both the oxidized and the oxidized and carboxylated hardwood lignosulfonates are more effective than the corresponding softwood lignosulfonates as sacrificial agents where sandstone is used as adsorbent. For CaCO$_3$ as adsorbent oxidized or oxidized and carboxylated softwood lignosulfonates were more effective sacrificial agents than oxidized or oxidized and carboxylated hardwood lignosulfonates.

The differences in performance between the hardwood and softwood derivatives can possibly be explained on the basis of their chemical structures. Softwood lignosulfonates are predominantly of the guaiacyl structure, whereas hardwood lignosulfonates have both the guaiacyl and the syringyl structures. The major feature of the oxidation reaction is the conversion of methoxyl groups (inactive) to phenolic groups (active). Thus, oxidized hardwood lignosulfonates have more phenolic groups because the syringyl structure has twice as many methoxyl groups than the guaiacyl structure. Hydrogen bonding between the phenolic groups of the oxidized lignosulfonates and the oxygens of the sandstone surfaces is a probable mechanism contributing to the enhanced adsorption of oxidized lignosulfonates on sandstone. It should be emphasized that electrostatic attraction between the anionic functional groups (sulfonates and carboxylates) on the modified lignosulfonates and sandstone surfaces also contributes to the adsorption of these lignosulfonates.

The following examples (IV–VIII) demonstrate the performance of modified lignosulfonates in oil recovery from crushed limestone packs or sand packs in the laboratory. In those tests the packs were saturated with oil and then water flooded to a residual oil saturation. Then the surfactant solutions were injected followed by polymer solutions.

EXAMPLE IV

OIL RECOVERY FROM CRUSHED LIMESTONE PACKS

Surfactant System: 0.4% Dodecylbenzene sulfonate + 0.6% Sulfonated 4 mole EO adduct of nonyl phenol + 1.0% Lignosulfonate in 65,000 ppm TDS brine Polymer: 0.1% Polysaccharide polymer B-1459 in 65,000 ppm TDS brine

| Sulfomethylated Lignosulfonates | % Pore Volume Surfactant Injected | % Pore Volume Polymer Injected | % Tertiary Oil Recovery |
|---|---|---|---|
| None | 20 | 50 | 62.8 |
| Marasperse BS-22-3 (Sulfomethylated Na salt) | 20 | 50 | 91.0 |
| Marasperse 22 S-Z (sulfomethylated and oxidized Na salt) | 20 | 50 | 88.6 |

EXAMPLE V

Surfactant System: 1% Sulfated 4 mole EO adduct of nonyl phenol + 1% Lignosulfonate in 180,000 ppm TDS brine Polymer: 0.1% Polysaccharide polymer B-1459 in 180,000 ppm TDS brine

| Sulfomethylated Lignosulfonates | % Pore Volume Surfactant Injected | % Pore Volume Polymer Injected | % Tertiary Oil Recovery |
|---|---|---|---|
| None | 15 | 50 | 60.0 |
| Marasperse BS-22-6 (sulfomethylated Na salt) | 15 | 50 | 76.7 |
| Marasperse 22S-Z (Sulfomethylated and oxidized Na salt) | 15 | 50 | 79.4 |
| Norlig 41S-2Z (sulfomethylated and oxidized Ca salt) | 15 | 50 | 78.0 |

EXAMPLE VI

OIL RECOVERY FROM DOG LAKE SAND PACKS

Surfactant System: 2.0% Petroleum sulfonate + 0.6% sulfonated 6 mole EO adduct of nonyl phenol + 1% Lignosulfonate in 105,000 ppm TDS brine Polymer: 0.1% Polysaccharide polymer B-1459

| Sulfomethylated and Carboxylated Lignosulfonate | % Pore Volume Surfactant Injected | % Pore Volume Polymer Injected | % Tertiary Oil Recovery |
|---|---|---|---|
| None | 25 | 100 | 65.8 |
| Norlig 42SCAA Na salt, hardwood sulfomethylated then reacted with chloroacetic acid | 25 | 100 | 82.1 |

EXAMPLE VII

OIL RECOVERY FROM DOG LAKE SAND PACKS

Surfactant System: 2.0% Petroleum sulfonate + 0.6% sulfonated 6 mole EO adduct of nonyl phenol + 1% Lignosulfonate in 105,000 ppm TDS brine Polymer: 0.1% Polysaccharide polymer B-1459

| Carboxylated Lignosulfonate | % Pore Volume Surfactant Injected | % Pore Volume Polymer Injected | % Tertiary Oil Recovery |
|---|---|---|---|
| None | 25 | 100 | 65.8 |
| Norlig 92CAA Na salt, softwood carboxylated with chloroacetic acid | 25 | 100 | 80.0 |

EXAMPLE VIII

OIL RECOVERY FROM DOG LAKE SAND PACKS

Surfactant System: 2.0% Petroleum sulfonate + 0.6% adduct sulfonate 6 mole EO adduct of nonyl phenol + 1% Lignosulfonate in 105,000 ppm TDS brine Polymer: 0.1% Polysaccharide polymer B-1459

| Oxidized and Carboxylated Lignosulfonate | % Pore Volume Surfactant Injected | % Pore Volume Polymer Injected | % Tertiary Oil Recovery |
|---|---|---|---|
| None | 25 | 100 | 64.5 |
| Norlig 42ZCAA Na salt, Hardwood oxidized then carboxylated with chloroacetic acid | 25 | 100 | 84.1 |

I claim:

1. In a method for recovering oil from a subterranean formation containing oil and having an injection well and a production well wherein an aqueous surfactant solution is injected into the injection well in order to drive the oil to the production well wherein it is produced the improvement which comprises:

injecting into the injection well in admixture with the surfactant solution lignosulfonates modified by oxidation with oxygen or ozone and sulfomethylation wherein the methylene sulfonate radical is added to the lignosulfonate wherein the lignosulfonates are present in an amount effective for reducing the extent of adsorption of the surfactant by the formation matrix.

2. In a method for recovering oil from a subterranean formation containing oil and having an injection well and a production well wherein an aqueous surfactant solution is injected into the injection well in order to drive the oil to the production well wherein it is produced the improvement which comprises:

injecting into the injection well in admixture with the surfactant solution lignosulfonates modified by oxidation with oxygen or ozone and reaction with chloroacetic acid whereby said chloroacetic acid reacts with phenolic, hydroxyl and sulfonate groups in said lignosulfonates to yield carboxylate groups wherein the lignosulfonates are present in an amount effective for reducing the extent of adsorption of the surfactant by the formation matrix.

3. In a method for recovering oil from a subterranean formation containing oil and having an injection well and a production well wherein an aqueous surfactant solution is injected into the injection well in order to drive the oil to the production well wherein it is produced the improvement which comprises:

injecting into the injection well in admixture with the surfactant solution lignosulfonates modified by sulfomethylation wherein the methylene sulfonate radical is added to the lignosulfonates and reaction with chloroacetic acid whereby said chloroacetic acid reacts with phenolic, hydroxyl and sulfonate groups in said lignosulfonates to yield carboxylate groups wherein the lignosulfonates are present in an amount effective for reducing the extent of adsorption of the surfactant by the formation matrix.

4. A method for recovering oil from a subterranean formation containing oil and having an injection well and a production well wherein flooding water is injected into the subterranean formation comprising:
(a) injecting through the injection well into the formation an aqueous solution of lignosulfonates modified by oxidation with oxygen or ozone and sulfomethylation wherein the methylene sulfonate radical is added to the lignosulfonates wherein the lignosulfonates are present in an amount effective for reducing the extent of adsorption of the surfactant by the formation matrix,
(b) subsequently injecting into the formation via the injection well an aqueous surfactant solution also containing lignosulfonates in an amount as in (a) and modified as in (a) and
(c) producing oil from the formation via the production well.

5. A method for recovering oil from a subterranean formation containing oil and having an injection well and a production well wherein flooding water is injected into the subterranean formation comprising:
(a) injecting through the injection well into the formation an aqueous solution of lignosulfonates modified by oxidation with oxygen or ozone and reaction with chloroacetic acid whereby said chloroacetic acid reacts with phenolic, hydroxyl and sulfonate groups in said lignosulfonates to yield carboxylate groups wherein the lignosulfonates are present in an amount effective for reducing the extent of adsorption of the surfactant by the formation matrix,
(b) subsequently injecting into the formation via the injection well an aqueous surfactant solution also containing lignosulfonates in an amount as in (a) and modified as in (a) and
(c) producing oil from the formation via the production well.

6. A method for recovering oil from a subterranean formation containing oil and having an injection well and a production well wherein flooding water is injected into the subterranean formation comprising:
(a) injecting through the injection well into the formation an aqueous solution of lignosulfonates modified by sulfomethylation wherein the methylene sulfonate radical is added to the lignosulfonates and reaction with chloroacetic acid whereby said chloroacetic acid reacts with phenolic, hydroxyl and sulfonate groups in said lignosulfonates to yield carboxylate groups wherein the lignosulfonates are present in an amount effective for reducing the extent of adsorption of the surfactant by the formation matrix,
(b) subsequently injecting into the formation via the injection well an aqueous surfactant solution also containing lignosulfonates in an amount as in (a) and modified as in (a) and
(c) producing oil from the formation via the production well.

7. A method for recovering oil from a subterranean formation containing oil and having an injection well and a production well wherein flooding water is injected into the subterranean formation comprising:
(a) injecting through the injection well into the formation an aqueous solution of lignosulfonates modified by oxidation with oxygen or ozone and sulfomethylation wherein the methylene sulfonate radical is added to the lignosulfonates wherein the lignosulfonates are present in an amount effective for reducing the extent of adsorption of the surfactant by the formation matrix,
(b) subsequently injecting into the formation via the injection well an aqueous surfactant solution and
(c) producing oil from the formation via the production well.

8. A method for recovering oil from a subterranean formation containing oil and having an injection well and a production well wherein flooding water is injected into the subterranean formation comprising:
(a) injecting through the injection well into the formation an aqueous solution of lignosulfonates modified by oxidation with oxygen or ozone and reaction with chloroacetic acid whereby said chloroacetic reacts with phenolic, hydroxyl and sulfonate groups in said lignosulfonates to yield carboxylate groups wherein the lignosulfonates are present in an amount effective for reducing the extent of adsorption of the surfactant by the formation matrix,
(b) subsequently injecting into the formation via the injection well an aqueous sUrfactant solution and
(c) producing oil from the formation via the production well.

9. A method for recovering oil from a subterranean formation containing oil and having an injection well and a production well wherein flooding water is injected into the subterranean formation comprising:
(a) injecting through the injection well into the formation an aqueous solution of lignosulfonates modified by sulfomethylation where the methylene sulfonate radical is added to the lignosulfonates in reaction with chloroacetic acid whereby said chloroacetic acid reacts with phenolic, hydroxyl and sulfonate groups in said lignosulfonates to yield carboxylate groups wherein the lignosulfonates are present in an amount effective for reducing the extent of adsorption of the surfactant by the formation matrix,
(b) subsequently injecting into the formation via the injection well an aqueous surfactant solution and
(c) producing oil from the formation via the production well.

* * * * *